Aug. 4, 1959     M. J. WACLAWEK     2,897,689
TRANSMISSION
Filed Nov. 22, 1954
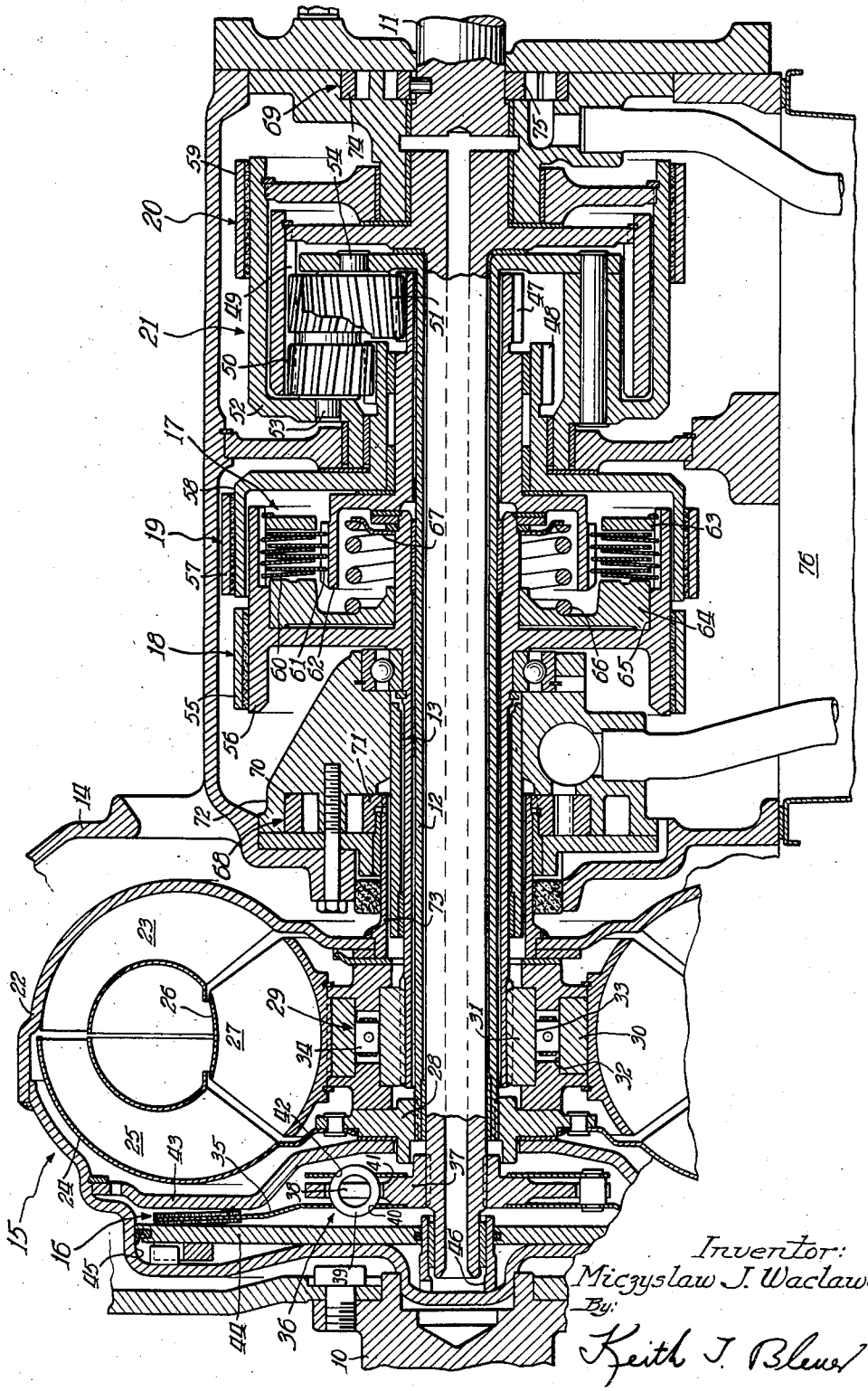
Inventor:
Mieczyslaw J. Waclawek
By: Keith J. Blewe Atty.

United States Patent Office 2,897,689
Patented Aug. 4, 1959

2,897,689

TRANSMISSION

Miczyslaw J. Waclawek, Chicago, Ill., assignor to Borg-Warner Corporation, Chicago, Ill., a corporation of Illinois Application November 22, 1954, Serial No. 470,226

5 Claims. (Cl. 74—688)

My invention relates to transmissions for automotive vehicles and more particularly to such transmissions of the hydraulic type.

It is an object of the present invention to provide an improved hydraulic transmission which comprises a hydraulic torque converter driven from the drive shaft of the transmission and which is so arranged that a direct drive may be completed between the drive and driven shafts of the transmission exclusive of two other forward drive power trains of different ratio which include the hydraulic torque converter. It is contemplated that preferably one of these other power trains is an underdrive and the other is an overdrive. It is also contemplated that the construction shall be such that the force on the stator of the hydraulic torque converter in the reverse direction may be utilized for driving the driven shaft of the transmission in the reverse direction for a reverse drive of the vehicle.

It is also an object to so arrange the transmission that a number of different vehicle braking drives may be had, as for example by completing the reverse drive power train either with or without engagement of a direct drive clutch providing the direct drive power train, by simultaneously completing the direct drive and underdrive power trains and by simultaneously completing the direct drive and overdrive power trains, the hydraulic torque converter in all of these cases providing a slip which allows the drive shaft and driven shaft both to continue rotating but with the driven shaft being braked by the vehicle engine.

The invention consists of the novel constructions, arrangements and devices to be hereinafter described and claimed for carrying out the above-stated objects and such other objects as will appear from the following description of a preferred embodiment of the invention, illustrated with reference to the accompanying drawing in which the figure is a longitudinal sectional view through a transmission embodying the principles of the invention.

Referring now to the drawing, the illustrated transmission comprises a drive shaft 10, a driven shaft 11, an intermediate quill shaft 12 and another quill shaft 13 disposed on the shaft 12. All of these shafts are coaxially disposed with respect to each other, and the shafts are journalled with respect to a transmission casing 14 by means of suitable bearings.

The transmission comprises in general a hydraulic torque converter 15; a single disk friction clutch 16; a multiple disk friction clutch 17; friction brakes 18, 19 and 20; and a planetary gear set 21.

The hydraulic torque converter 15 comprises a fluid housing or container 22 connected to and driven by the drive shaft 10 and having fluid impeller blades 23 disposed and fixed therein so that the housing also forms a fluid impeller. The torque converter comprises also a runner, turbine, or driven element 24 having runner blades 25 fixed therein and also a stator 26 having stator blades 27.

The runner 24 is fixed to a hub 28 that in turn is splined on the quill shaft 12. A one-way engaging device 29 is disposed between the stator 26 and the quill shaft 13. The one-way device 29 may be of any suitable type and, as shown, comprises an external hub 30 fixed to the stator 26 and in internal hub 31 splined to the shaft 13. The hubs 30 and 31 are respectively provided with cylindrical race surfaces 32 and 33, and a plurality of tiltable sprags 34 are disposed between the surfaces 32 and 33 and are adapted to wedge between the surfaces. The one-way device 29 is so arranged that, assuming the hub 31 is held stationary, the hub 30 and stator 26 fixed thereto may freely rotate in the forward direction, that is, in the same direction the drive shaft 10 is driven, but the sprags 34 tilt and engage between the surfaces 32 and 33 to prevent rotation of the hub 30 and thereby the stator 26 in the reverse direction.

The torque converter 15 is of well-known construction, and further details of construction are deemed unnecessary. Initially, when the impeller 22 is driven from the drive shaft 10, the fluid in flowing torodially from the blades 23 through the blades 25 and from thence through the blades 27 and back again into the blades 23 causes the turbine 24 to be driven in the forward direction at an increased torque with respect to the torque applied to the drive shaft 10, the stator blades 27 redirecting the fluid from the runner 24 into the impeller blades 23 in the same direction the impeller 22 is rotated by the drive shaft 10. When the speed of the turbine 24 increases sufficiently, a so-called "clutch point" is reached at which time the reaction on the stator blades 27 reverses from the reverse direction to the forward direction, and the stator 26 begins to rotate in the forward direction, being permitted such rotation by the one-way engaging device 29 which releases. After this, the converter 15 functions as a simple fluid coupling, applying the same torque on the runner 24 as is applied to the drive shaft 10.

The friction clutch 16 comprises a friction disk 35 carried through the intermediary of a spring dampener assembly 36 by the shaft 11. The dampener assembly 36 comprises a hub 37 splined on the shaft 11 and having window-like openings 38 therein in which springs 39 are disposed. The disk 35 is provided with similar openings 40 also receiving the springs and is disposed on one side of the hub 37. A washer 41 is disposed on the other side of the hub 37, is fixed to the disk 35 and is provided with similar openings 42 also receiving the springs 39. The assembly 36 is of well-known construction and functions to transmit torque from the disk 35 to the hub 37 and shaft 11 dampening vibrations during such transmission of power.

The disk 35 is disposed between a housing divider plate 43 fixed in the housing 22 and an annular pressure plate 44. The pressure plate 44 is slidably disposed in a cylindrical cavity 45 formed in the housing 22 and is slidable on a sleeve 46 fixed with respect to the housing 22 on its axis. The pressure plate is suitably sealed with respect to the sleeve 46 and the surface of the cavity 45, and when fluid pressure is applied behind the pressure plate 44, the plate 44 acts as a piston and clamps the periphery of the disk 35 between the divider plate 43 and the pressure plate 44 to engage the clutch 16, so that power is transmitted directly from the drive shaft 10 to the driven shaft 11.

The planetary gear set 21 comprises a sun gear 47, a second sun gear 48, a ring gear 49, a set of planet gears 50, a set of planet gears 51, and a carrier 52 for the planet gears. The carrier comprises stub shafts 53 and 54 on which the planet gears 50 and 51 are respectively rotatably disposed. Each of the planet gears 51 is in mesh with the sun gear 47 and is also in mesh with one of the planet gears 50. Each of the planet gears 50 is also in mesh with the ring gear 49 and with the sun gear 48. The ring gear 49 is fixed to the driven shaft 11, and the carrier 52 is formed on the quill shaft 12. The sun gear 47 is rotatably disposed on the quill shaft 12.

The brake 18 comprises a brake band 55 adapted to be contracted on a brake drum 56 formed on the shaft 13. The brake 19 comprises a brake band 57 adapted to be contracted into gripping engagement with a brake drum 58 formed integral with the sun gear 48. The brake 20 comprises a brake band 59 adapted to be contracted to grippingly engage the exterior surface of the planet gear carrier 52.

The friction clutch 17 comprises a plurality of clutch disks 60 splined within the drum 56, a plurality of clutch disks 61 interleaved with the disks 60 and splined to the exterior of a drum portion 62 formed integral with the sun gear 47, a backing plate 63 for the disks 60 and 61 and fixed within the drum 56, and a pressure applying piston 64 disposed on the side of the stacked disks opposite the backing plate 63. The piston 64 is annular and is slidably disposed in an annular cavity 65 formed in the drum 56, and a return spring 66 is provided between the piston 64 and an annular spring retainer 67 fixed with respect to the drum 56.

The clutch 17 may be engaged by applying fluid pressure behind the piston 64 within the cavity 65 so as to compress the stacked disks 60 and 61 between the piston 64 and pressure plate 63, the piston 64 moving in the clutch engaging direction against the action of the spring 66. Any suitable pressure actuated servo-motors may be provided in connection with the friction brake bands 55, 57 and 59 for engaging the corresponding friction brakes 18, 19 and 20.

Any suitable source of fluid pressure may be used in connection with the friction brakes and clutches for applying them; however, preferably two pumps 68 and 69 driven respectively by the drive shaft 10 and driven shaft 11 are utilized. The pump 68 is of a well-known type and comprises a ring gear 70 eccentrically located with respect to the axis of the shafts 10 and 11 and a central gear 71 in mesh with the gear 70, both the gears 70 and 71 being rotatably disposed in a pump casing portion 72 fixedly disposed in the transmission casing 14. The gear 71 is splined to a short sleeve 73 fixed with respect to the converter housing 22 which in turn is driven by the drive shaft 10. The pump 69 is of similar construction, comprising a ring gear 74 and a central gear 75 in mesh with the gear 74 and fixed to rotate with the driven shaft 11. The pumps 68 and 69 function to pump liquid, preferably out of the lower portion of the transmission housing 14 constituting a sump 76, in order to provide a suitable pressure source for engaging the friction clutches and brakes.

The illustrated transmission provides a low speed underdrive, an overdrive and a reverse drive in which all of the power from the drive shaft 10 flows through the hydraulic torque converter 15, and the transmission also provides a direct drive which is exclusive of the hydraulic torque converter 15. The transmission also provides a number of coasting conditions in which a drag from the slip in the torque converter and from the engine of the vehicle through the drive shaft 10 is imposed on the driven shaft 11.

The low speed drive is obtained by engaging the brake 18 and the clutch 17. The brake 18 acts through the one-way engaging device 29 to hold the stator 26 against reverse rotation, so that the hydraulic unit 15 functions as a torque converter. The brake 18 acts through the clutch 17, which really, in this case, functions as a brake, for holding the sun gear 47 against rotation. The drive in this case is from the drive shaft 10 through the impeller 22, the runner 24, the quill shaft 12, the planet gear carrier 52, the planet gears 51 and 50 and the ring gear 49 to the driven shaft 11. The torque converter at low speeds of the runner 24 functions to drive the runner at increased torque and decreased speed with respect to the drive shaft 10, and the planet gear set 21, which in low speed drive is effectually in series with the hydraulic torque converter 15, functions to drive the driven shaft 11 at increased torque and reduced speed with respect to the torque converter output shaft 12, since the gear set 21 is of the duplex planet gear type. The overall torque multiplication between the shafts 10 and 11, thus, is the product of the torque multiplications of the hydraulic torque converter 15 and the planetary gearing 21. As the speeds of the driven shaft 11 and of the runner 24 increase, the stator 26 starts to rotate in the forward direction, being released for this direction of rotation by the one-way device 29, and the torque converter 15 then functions as a simple fluid coupling, and the torque multiplication between the shafts 10 and 11 is then produced solely by the planetary gear set 21.

Direct drive is obtained through the transmission by engaging the clutch 16 which functions to couple the drive shaft 10 directly with the driven shaft 11 exclusive of the hydraulic torque converter 15 and the gearing 21.

The overdrive power train is completed by engaging the brake 19 and the brake 18. The brake 18 functions, similarly as for low speed drive, to hold the stator 26 against reverse rotation, so that the hydraulic unit 15 can function at low speeds as a pure torque converter and at higher speeds as a simple fluid coupling. The brake 19 holds the sun gear 48 against rotation, so that the driven shaft 11 connected to the ring gear 49 is driven at an overspeed with respect to the quill shaft 12 which connects the turbine 24 of the torque converter 15 with the power input planet gear carrier 52.

Reverse drive is obtained by engaging the brake 20 and the clutch 17. The brake 20 is effective on the planet gear carrier 52 which is connected through the quill shaft 12 with the turbine 24 of the torque converter 15, and the brake 20 thus functions to hold the carrier 52 and also the turbine 24 against rotation. As is well known in connection with hydraulic torque converters of the illustrated type, if the runner or driven element is held stationary, the stator is driven in the reverse direction assuming it is unrestrained from such rotation. The stator 26 in this case drives in the reverse direction through the one-way engaging device, the quill shaft 13, the clutch 17, the sun gear 47, the planet gears 50 and 51 and the ring gear 49 to drive the driven shaft 11 in the reverse direction to complete the reverse drive power train through the transmission. The planet gear set 21 under these conditions reduces the speed and increases the torque with respect to the shaft 13, driving the driven shaft 11 in the same direction, that is, in the reverse direction, as the shaft 13 is driven from the stator 26 of the hydraulic torque converter.

Braking the vehicle by means of the vehicle engine is, of course, possible in either low speed forward drive, direct drive or overdrive, with the brake 18 and clutch 17, or the clutch 16, or the brakes 19 and 18 being respectively engaged, since all three of these drives are two-way drives. An augmented engine braking effect for the vehicle may be obtained by engaging the brake 18 and the clutches 17 and 16 simultaneously. The clutch 16 as has been described, completes a direct drive between the shafts 10 and 11, and the application of the brake 18 and clutch 17 simultaneously with the clutch 16 causes the runner 24 to be rotated at an increased speed with respect to the drive shaft 10. The brake 18 and the clutch 17 hold the sun gear 47 stationary, and the ring gear 49, being connected to the driven shaft 11, rotates along with and at the same speed as the driven shaft 11, causing the carrier 52 to be driven at an overdrive or overspeed with respect to the shaft 11, since the planetary gear set 21 is of the dual pinion gear type. The runner 24 is connected with the carrier by means of the shaft 12, and the runner is thus driven at an overspeed with respect to the shafts 10 and 11 against the resistance produced by the fluid in the torque converter 15 due to such difference in speed between the drive shaft 10 and the runner 24. This resistance to the overspeed rotation of the runner 24 is transmitted by the gear set 21 to the driven shaft 11 so as to provide an increased braking effect on the driven shaft 11 and thereby on the vehicle.

A still further augmented engine braking effect for movement forwardly is produced by a simultaneous engagement of the clutch 16, the brake 20 and the clutch 17. The clutch 16, as previously described, when engaged, couples directly the drive shaft 10 and the driven shaft 11. The simultaneous engagement of the brake 20 holds the turbine 24 stationary since the carrier 52, on which the brake 20 is effective, is connected by means of the shaft 12 with the turbine 24. The turbine 24, when stationary, functions to retard the rotation of the impeller 22 through the fluid of the torque converter 15 and of the drive shaft 10 connected thereto and thus prevents the increase in engine speed which would otherwise be obtained when the driven shaft 11 tends to increase in speed. Furthermore, clutch 17 connects stator 26 to sun gear 47 which is rotating forward at some speed greater than ring gear 49 thus causing stator 26 to rotate in the forward direction at a speed greater than driven shaft 11. The forward rotation of the stator tends to pump the torque converter fluid in a direction opposite to that of the impeller, thus, tending to keep the impeller and shaft 10 from speeding up. The driven shaft 11 is also correspondingly held from increased speed, since the shaft 11 is connected to the shaft 10 at this time by the clutch 16.

An augmented engine braking effect for movement forwardly is obtained by engagement of the reverse drive brake 20 and clutch 17, with the clutch 16 remaining disengaged. The effect of the turbine 24 to retard the rotation of the impeller and of the drive shaft 10 is the same as just described, although in some cases, the braking effect may be such as to cause the vehicle engine to stall without the clutch 16 being engaged to directly connect the driven shaft 11 with the drive shaft 10. When the reverse brake 20 and clutch 17 are engaged for braking effect, I have found that if this engagement occurs above a certain predetermined low forward speed of the vehicle, such as 15 m.p.h., the torque converter 15 exerts a relatively mild vehicle braking effect, with the fluid flowing in the converter 15 in one direction, while if the brake 20 and clutch 17 are engaged with the vehicle moving forwardly at some lower speed, such as 10 m.p.h., the torque converter 15 causes a relatively drastic braking effect, and the fluid in the torque converter flows in the opposite direction.

An augmented engine braking effect for movement forwardly is also produced by a simultaneous engagement of the brake 19, the clutch 17 and the clutch 16. The clutch 16 couples directly the drive shaft 10 and the driven shaft 11, as previously described. The simultaneous engagement of the brake 19 causes the turbine 24 to rotate forwardly at a fixed underdrive speed ratio with respect to the driven shaft 11, since the brake 19 is utilized as previously described for providing an overdrive from the turbine 24 to the driven shaft 11. The turbine 24 when rotating at a lower speed than the impeller 22 functions to retard the rotation of the impeller and drive shaft 10 through the fluid of the torque converter 15 and accordingly retards the driven shaft 11 connected with the drive shaft 10 by means of the clutch 16.

My improved transmission advantageously provides a low speed drive and an overdrive, both of which utilize the hydraulic torque converter for providing an increase in torque multiplication as the need arises due to the automatic functioning of the hydraulic torque converter. The transmission also advantageously has a direct drive which is exclusive of the hydraulic torque converter and is thus useful for providing a braking effect on the vehicle without the attendant slip between the driving and driven elements of the hydraulic torque converter.

The transmission also may be utilized for braking the vehicle additionally in a number of ways. The reverse drive power train may be completed either with or without the simultaneous engagement of the direct drive clutch 16 for providing a braking effect on the vehicle, and alternately, the two clutches may be engaged with either the brake 18 or the brake 19 engaged for braking the vehicle.

I wish it to be understood that my invention is not to be limited to the specific constructions and arrangements shown and described, except only insofar as the claims may be so limited, as it will be understood to those skilled in the art that changes may be made without departing from the principles of the invention.

I claim:

1. In a transmission, the combination of a drive shaft, a driven shaft, a hydraulic torque converter having an impeller driven by said drive shaft and a runner or driven element and a stator or reaction element, means including a gear set for effecting a relatively low speed power train between said shafts and including said impeller driving said runner, means for effecting an intermediate speed power train between said shafts exclusive of said torque converter, means for effecting a relatively high speed power train between said shafts and including said impeller driving said runner, brake means for holding said stator against reverse rotation so that said torque converter is effective for multiplying torque in both said low and high speed power trains, brake means for selectively holding said runner from rotation, and means including a clutch for effectively connecting said stator through said gear set with said driven shaft so that when said clutch and said last-named brake means are engaged said driven shaft is driven in the reverse direction through said torque converter.

2. In a transmission, the combination of a drive shaft, a driven shaft, a hydraulic torque converter having an impeller driven by said drive shaft and a runner or driven element and a stator or reaction element, a planetary gear set having a plurality of driving and driven and control members a first one of said members being connected to said driven shaft for driving the latter, a brake effective on said stator and on a second one of said members and means for connecting a third one of said members with said runner for effecting a change speed forward drive power train between said runner and said driven shaft, a brake for another of said members and a clutch for disconnecting said second member and said first-named brake for effecting a higher speed forward drive power train between said runner and said driven shaft when said two brakes are engaged and said clutch is disengaged, and a brake for said third member and for said runner for effecting a reverse drive power train between said shafts from said stator and through said clutch and gear set.

3. In a transmission, the combination of a drive shaft, a driven shaft, a hydraulic torque converter having an impeller driven by said drive shaft and a runner or driven element and a stator or reaction element, a planetary gear set having a plurality of driving and driven and control members a first one of said members being connected to said driven shaft for driving the latter, means for connecting a second one of said members with said runner and a brake for a third of said members and for said stator for effecting an underdrive power train between said runner and said driven shaft, a second brake for still another of said members and a clutch for disconnecting said third member from said first-named brake for effecting an overdrive power train between said runner and said driven shaft through said planetary gear set when said second brake is engaged and said clutch is disengaged, a friction clutch for connecting directly said driving and driven shafts, and a brake for said second member for effecting a reverse drive power train between said shafts from said stator through said first-named clutch and said planetary gear set when said last-named brake is engaged and said friction clutch is disengaged.

4. In a transmission, the combination of a drive shaft, a driven shaft, a hydraulic torque converter having an impeller driven by said drive shaft and a runner or driven element and a stator or reaction element, a planetary gear set having a sun gear and a ring gear and a planet gear element in mesh with said sun gear and a second planet gear element in mesh with said first planet gear element and with said ring gear and a planet gear element carrier and a reaction gear element in mesh with one of said planet gear elements, one of said gears being connected with said driven shaft and said carrier being connected to said runner, a brake for holding said stator and said reaction gear element from rotation for effecting a change speed drive between said shafts through said torque converter and said gear set, a clutch between said brake and said last-named gear for rendering the brake effective upon said last-named gear, a brake for said reaction gear element for effecting another change speed drive through said torque converter and said gear set when said last-named brake is engaged and said clutch is disengaged, and a brake for said carrier for holding the carrier and thereby said runner against rotation for effecting a reverse drive power train when said last-named brake and said clutch are both engaged, said reverse drive being from said impeller to said stator and thence through said clutch and said planet gear set to said driven shaft.

5. In a transmission, the combination of a drive shaft, a driven shaft, a hydraulic torque converter having an impeller driven by said drive shaft and a runner or driven element and a stator or reaction element, a planetary gear set having a sun gear and a ring gear and a planet gear in mesh with said sun gear and a planet gear in mesh with said first-named planet gear and with said ring gear and a planet gear carrier and a reaction sun gear in mesh with said second-named planet gear, said ring gear being connected with said driven shaft and said carrier being connected with said runner, a brake for said stator and a clutch for connecting said brake with said first-named sun gear so that the brake is effective on said first-named sun gear for effecting an underdrive between said shafts through said impeller and runner and planet gear set, a brake for said reaction sun gear for effecting an overdrive power train through said torque converter and said planet gear set when said last-named brake is engaged and said clutch is disengaged, a brake for said carrier for holding said carrier and said runner against rotation for effecting a reverse drive power train between said shafts when said last-named brake and said clutch are engaged with said power train including said impeller driving said stator and said clutch and planet gear set to said driven shaft, and a clutch for connecting directly said drive and driven shafts.

References Cited in the file of this patent

UNITED STATES PATENTS

| | | |
|---|---|---|
| 2,241,631 | Claytor | May 13, 1941 |
| 2,242,515 | Dodge | May 20, 1941 |
| 2,254,335 | Vincent | Sept. 2, 1941 |
| 2,352,004 | Pollard | June 20, 1944 |
| 2,456,328 | Schneider | Dec. 14, 1948 |
| 2,466,206 | Carnagua | Apr. 5, 1949 |
| 2,578,450 | Pollard | Dec. 11, 1951 |
| 2,682,786 | Flinn | July 6, 1954 |
| 2,772,581 | Maier et al. | Dec. 4, 1956 |